United States Patent
Janzer

(10) Patent No.: US 12,429,642 B2
(45) Date of Patent: Sep. 30, 2025

(54) ARRANGEMENT FOR REFLECTION SUPPRESSION IN A WINDSCREEN DISPLAY SYSTEM, AND WINDSCREEN DISPLAY SYSTEM

(71) Applicant: Bayerische Motoren Werke Aktiengesellschaft, Munich (DE)

(72) Inventor: Michael Arthur Janzer, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 595 days.

(21) Appl. No.: 17/796,297

(22) PCT Filed: Feb. 18, 2021

(86) PCT No.: PCT/EP2021/054026
§ 371 (c)(1),
(2) Date: Jul. 29, 2022

(87) PCT Pub. No.: WO2021/175608
PCT Pub. Date: Sep. 10, 2021

(65) Prior Publication Data
US 2023/0070075 A1 Mar. 9, 2023

(30) Foreign Application Priority Data
Mar. 6, 2020 (DE) .................... 10 2020 106 160.9

(51) Int. Cl.
*B60K 35/00* (2024.01)
*B60K 35/23* (2024.01)
(Continued)

(52) U.S. Cl.
CPC ............ *G02B 5/3025* (2013.01); *B60K 35/23* (2024.01); *B60K 35/60* (2024.01); *B60K 35/415* (2024.01);
(Continued)

(58) Field of Classification Search
CPC ...... B60K 35/00; B60K 35/415; B60K 35/23; B60K 35/60; B60K 35/21;
(Continued)

(56) References Cited

U.S. PATENT DOCUMENTS 5,552,935 A 9/1996 Knoll et al.
6,486,856 B1 11/2002 Zink
(Continued)

FOREIGN PATENT DOCUMENTS

DE 38 22 222 A1 1/1990
DE 198 16 647 A1 10/1999
(Continued)

OTHER PUBLICATIONS

Wall, Christian, DE 10 2010 032998 A1, published Feb. 2, 2012, English language machine translation, generated Mar. 7, 2025 (Year: 2012).*

(Continued)

*Primary Examiner* — Stephone B Allen
*Assistant Examiner* — Adam W Booher
(74) *Attorney, Agent, or Firm* — Crowell & Moring LLP

(57) ABSTRACT

A windscreen display system for a motor vehicle includes a head-up display device. The head-up display device includes a projection device for emitting a projection light beam with a first item of image information towards a first display region of a windscreen so that it is reflected there and can be perceived in an eye region, and a transparent covering for protecting the projection device, the covering having a cover pane and a first polarization filter, the first polarization filter transmitting light with a first polarization direction and fully reflecting light with a second polarization direction.

3 Claims, 2 Drawing Sheets

(51) Int. Cl.
*B60K 35/40* (2024.01)
*B60K 35/60* (2024.01)
*G02B 5/30* (2006.01)

(52) U.S. Cl.
CPC .... *B60K 2360/25* (2024.01); *B60K 2360/785* (2024.01)

(58) Field of Classification Search
CPC .......... B60K 35/231–235; B60K 35/50; B60K 2360/785; B60K 2360/25; B60K 2360/23; B60K 2360/27; B60K 2360/28; B60K 2360/29; B60K 2360/31; B60K 2360/334; B60K 2360/347; B60K 2360/66; B60K 37/00–20; G02B 27/01; G02B 27/0101; G02B 2027/0118–0121; G02B 5/3025–3058

See application file for complete search history.

(56) References Cited

U.S. PATENT DOCUMENTS

| | | |
|---|---|---|
| 2011/0317273 A1 | 12/2011 | Kasai et al. |
| 2019/0258059 A1 | 8/2019 | Takahashi |
| 2020/0026073 A1* | 1/2020 | Nambara ................ B60K 35/60 |
| 2020/0353816 A1* | 11/2020 | Hirata .................... G06F 3/013 |

FOREIGN PATENT DOCUMENTS

| | | |
|---|---|---|
| DE | 10 2010 032 998 A1 | 2/2012 |
| DE | 10 2014 211 339 A1 | 12/2015 |
| DE | 10 2014 214 510 A1 | 1/2016 |
| DE | 10 2017 206 364 A1 | 10/2018 |
| DE | 10 2017 219 069 A1 | 4/2019 |
| DE | 10 2017 215 378 B4 | 6/2019 |
| DE | 10 2019 201 475 A1 | 8/2019 |
| EP | 3 133 436 A1 | 2/2017 |
| JP | 2003-57587 A | 2/2003 |
| JP | 2015-34918 A | 2/2015 |
| JP | 2018-59965 A | 4/2018 |

OTHER PUBLICATIONS

International Search Report (PCT/ISA/210) issued in PCT Application No. PCT/EP2021/054026 dated Apr. 30, 2021 with English translation (five (5) pages).

German-language Written Opinion (PCT/ISA/237) issued in PCT Application No. PCT/EP2021/054026 dated Apr. 30, 2021 (seven (7) pages).

German-language Search Report issued in German Application No. 10 2020 106 160.9 dated Nov. 3, 2020 with partial English translation (11 pages).

* cited by examiner

ARRANGEMENT FOR REFLECTION SUPPRESSION IN A WINDSCREEN DISPLAY SYSTEM, AND WINDSCREEN DISPLAY SYSTEM

BACKGROUND AND SUMMARY OF THE INVENTION

The invention relates to windscreen display systems, in particular having head-up display devices, for motor vehicles. In particular, the present invention relates to measures for suppressing interfering reflections due to ambient light incident in a projection device of the head-up display device.

Windscreen display devices, such as head-up display devices, for the visual display of items of information in the field of view of a driver of a motor vehicle are known from the prior art. For example, document DE 10 2010 032 998 A1 describes a head-up display for a motor vehicle having a projection device, via which an image to be displayed is projected on a windscreen of a motor vehicle acting as a combiner device. Such windscreen display devices have the advantage, in contrast to the other display devices in the motor vehicle, that the driver does not have to look away from the traffic events to acquire important items of information, for example, the present vehicle speed or visual instructions of a navigation system.

In known head-up display devices, measures are provided to prevent ambient light, which is incident in a projection device of the head-up display device, from being reflected on the windscreen of the motor vehicle, being reflected from there in the direction of the driver, and thus dazzling the driver and/or impairing the representation of the information to be displayed. The projection device is therefore generally provided with a reflective and curved cover plate, which reflects incident ambient light in the direction of a light-absorbing surface, also called a mirror bank. The reflected ambient light is only reflected to a minor extent on the light-absorbing surface, so that interfering reflections of ambient light or lights in a display region on the windscreen can be essentially avoided.

Head-up display devices are typically used in an upper side of a dashboard in the region above the steering column, where in general only a limited installation space is available. In general, the conventional assembly made up of the light-absorbing surface and the reflective curved cover plate has a structural height between 5 and 10 cm, which significantly increases the overall structural height of the head-up display device. Reducing the structural height of this assembly can only be achieved to a limited extent, since with a flatter, i.e., less curved cover plate, a greater height of the light-absorbing surface is required.

An arrangement for reflection reduction for a windscreen display device for a motor vehicle is known from document DE 10 2017 206 364 A1, comprising: a transparent cover plate for protecting a projection device and an optical grating, with which a transparent substrate of the cover plate is provided and which is designed to absorb incident light from the surroundings on a first surface side of the cover plate at an angle of incidence within an angle of incidence range and to transmit projection light incident on a second surface side of the cover plate at an angle of incidence within a projection angle range.

Arrangements for reflection prevention for a windscreen display device are known from documents DE 10 2014 214 510 A1 and DE 10 2017 219 069 A1, which have an optical grating made of grating elements and thus implement segmented mirror banks. Since the grating elements of the grating are arranged in the beam path of the windscreen display device, the grating elements have to have a low thickness and moreover have to be aligned in their setting angle as parallel as possible to the beam path of the light beams adjacent thereto.

A motor vehicle having a display device is known from document DE 10 2017 215 378 B4, which has at least one multiple display, wherein the display device is arranged in the field of view of a driver of the motor vehicle in such a way that a first viewing angle range corresponds to that of a driver on the display device and a second viewing angle range is oriented toward a reflective section, which is formed reflective in the direction of the driver and is adjacent to a windscreen base of the windscreen.

Such a display device, which is called a windscreen base display device herein, is generally arranged under a reflective region at the lower edge of a windscreen of a motor vehicle. A windscreen base display device has a self-illuminating display surface, via which an item of image information can be output. This image information is reflected on the reflective region of the windscreen and is perceptible via this by the driver.

In a combination of a conventional head-up display device with a windscreen base display device, this can have the result that the mirror bank at least partially blocks the view of the reflective region of the windscreen base display device. Due to the restricted installation space in the dashboard, however, a projection device of the windscreen display device cannot be lowered arbitrarily, so that either the cover plate of the windscreen display device or the mirror bank is located in the beam path for the perception of the windscreen base display device.

It is therefore the object of the present invention to provide an improved display system having a head-up display device, which has a reflection suppression and is combinable with a windscreen base display device without impairing the reflection suppression.

This object is achieved by a windscreen display system for a motor vehicle for reflection suppression according to the claimed invention.

According to one aspect, a windscreen display device for a motor vehicle having a head-up display device is provided, wherein the head-up display device has a projection device for emitting a projection light beam having a first item of image information in the direction of a first display region of a windscreen, so that it is reflected there and is perceptible in an eye region, and a transparent cover for protecting the projection device, wherein the cover has a cover plate and a first polarization filter, wherein the first polarization filter transmits light of a first polarization direction and completely reflects light of a second polarization direction.

One concept of the above windscreen display system is to provide the cover of a projection device of a head-up display device with a first polarization filter. The head-up display device is used to output a first item of image information by reflecting an image information light beam at a combiner region of the windscreen into an eye of the driver of the motor vehicle. The cover is used to protect the projection device from external influences, for example, soiling.

The first polarization filter is designed to transmit only light of a first polarization direction, for example, s-polarized light or p-polarized light, and to reflect light of a second polarization direction, p-polarized light or s-polarized light, respectively. The cover has an arrangement and an alignment to reflect ambient light incident on the cover onto a windscreen base region, which corresponds to a region of the windscreen of a motor vehicle adjoining a lower edge of a windscreen. This windscreen base region assumes the function of a mirror bank of conventional head-up display devices.

The windscreen base region has a second polarization filter, the polarization behavior of which has a polarization direction pivoted by 90° with respect to the first polarization filter. The second polarization filter is thus designed to transmit light of the first polarization direction into the windshield and to reflect light of the second polarization direction. In other words, if the first polarization filter reflects p-polarized light and transmits this s-polarized light, the second polarization filter is thus designed to reflect s-polarized light and to transmit p-polarized light and vice versa. Ambient light reflected from the cover in the windscreen base region is thus prevented from being reflected again and reaching the eye of the driver, so that he is dazzled.

Due to the use of polarization filters on the cover plate of the cover and in the windscreen base region of the windscreen, on the one hand, the windscreen base region can be used as a mirror bank for the head-up display device. At the same time, light having a second polarization direction can be reflected via the windscreen base region. It is thus possible in principle to additionally provide a windscreen base display device for providing a second item of image information, which outputs the second image information using projection light of the first polarization direction, which is reflected via the polarization filter onto the windscreen base region of the windscreen.

In contrast, light of the second polarization direction is transmitted by the second polarization filter and transmitted by the windscreen base region. According to one embodiment, the windscreen base region can be formed as a black print region, so that light of the second polarization direction is transmitted by the second polarization filter and absorbed in the black print region. The light which is reflected at the first polarization filter into the windscreen base region and represents light of the second polarization direction is therefore also coupled into the windscreen and transmitted or absorbed.

A compatibility of a windscreen base display device with a head-up display device is thus achieved in a compact construction, wherein no mirror bank conceals the view of the windscreen base region and wherein dazzling of the driver due to ambient light reflected on the cover is reduced or prevented. Due to the simultaneous usage of the windscreen base region of the windscreen both as a mirror bank for the head-up display device and also as a display surface for the windscreen base display device, in addition the typical curvature of the cover plate of the cover can also be reduced and thus the structural height of the head-up display device can be decreased.

Furthermore, the cover can thus be arranged and formed, in particular curved, wherein the reflected component of the ambient light in the second polarization direction is largely reflected onto a windscreen base region.

Furthermore, the windscreen base region can be provided with a second polarization filter which is designed to reflect light of a first polarization direction and to transmit light of a second polarization direction.

A windscreen base display device can be provided to output a second item of image information via a display device so that it is reflected in the windscreen base region in such a way that the reflected second image information is perceptible in the eye region, wherein the display device outputs the second image information using light of the first polarization direction.

In particular, the first and/or the second polarization filter can be designed as a wire mesh polarizer or as a multilayer reflection polarizer.

Furthermore, the first polarization direction can correspond to an s-polarization direction and the second polarization direction to a p-polarization direction or the first polarization direction can correspond to a p-polarization direction and the second polarization direction to an s-polarization direction.

Embodiments are explained in more detail hereinafter on the basis of the appended drawings.

DETAILED DESCRIPTION OF THE DRAWINGS

Figure 1:
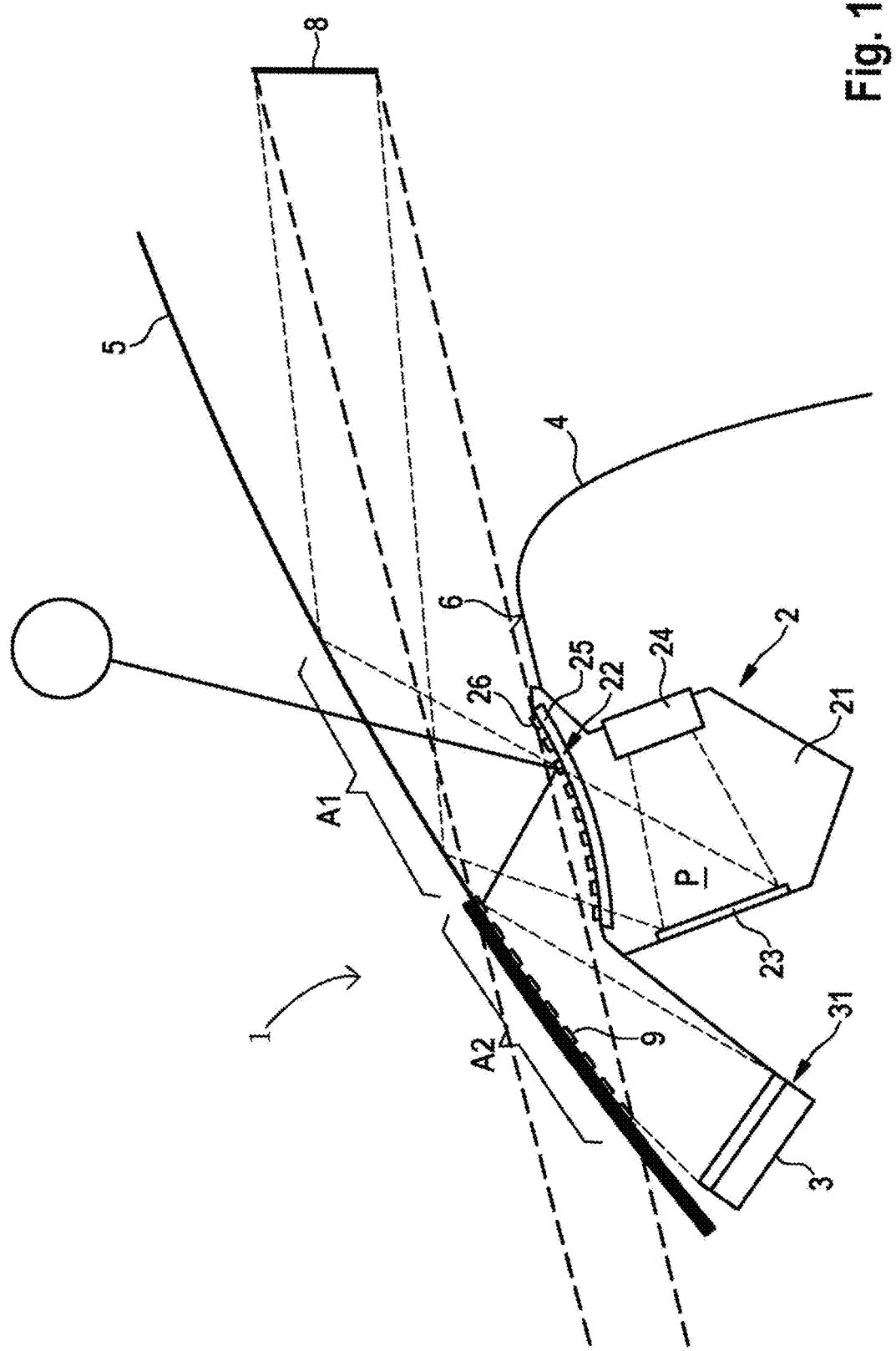
FIG. 1 shows a schematic cross-sectional view through a windscreen display system for a motor vehicle.

FIG. 1 schematically shows a cross-sectional view through a windscreen display system 1 having a head-up display device 2 and a windscreen base display device 3. The head-up display device 2 comprises a projection device 21 for emitting a projection light beam P having a first item of image information and a cover 22. The projection beam P is directed onto a first display region A1 of a windscreen 5 of a motor vehicle, so that it is reflected there into an eye region 8 (eye box) of the driver.

The cover 22 is used to protect the projection device 21 from external influences, in particular from soiling. The cover 22 of the projection device 21 has a cover plate 25 and is preferably curved to bundle incident ambient light and reflect it in a targeted manner.

The head-up display device 2 is essentially inserted into an opening of an upper side 6 of a dashboard 4 between a steering wheel and a windscreen 5 of a motor vehicle so that it terminates essentially flush with the upper side 6 or adjoins it.

The projection device 21 comprises in a known manner a system made up of one or multiple mirrors 23, possibly lenses (not shown), and a projector 24. The first image information output by the projector 24 is oriented as a projection light beam P by the one or the multiple mirrors 23 in the projection direction and projected on the display region A1. The projection light beam P reflected in the first display region A1 into the eye of the driver is used to display a corresponding item of information for the driver.

Below the first display region A1 is a second display region A2. The second display region A2, also called the windscreen base region here, is arranged between the lower edge of the windscreen 5 and the first display region A1. The second display region A2 can, for example, directly adjoin the lower edge of the windscreen 5. The display regions A1 and A2 can adjoin one another or have a distance to one another.

In particular, the second display region A2 can be formed as a black print region to suppress transmission of light and reflect a second item of image information displayed on a windscreen base display device 3 so that the reflected image can be perceived by the driver, on which the projection light beam of the head-up display device 2 is also directed.

The windscreen base display device 3 can comprise a simple self-illuminating display device 31, in particular in the form of an LCD display having backlight or an OLED display device, which is arranged and aligned in relation to the second display region A2 so that the second image information displayed there can be perceived by the driver in the eye region 8.

The driver can thus perceive both the second image information of the windscreen base display device 3 and also the first image information of the head-up display device 2 simultaneously via the second or first display region A2, A1, respectively. The display regions A1, A2 are preferably arranged one over the other in the vertical direction. However, these can also alternatively or additionally be arranged laterally offset in relation to one another.

The cover plate 25 of the cover 22 of the projection device 21 is curved so that incident ambient light is reflected in the windscreen base region. The windscreen base region is therefore to be used as a mirror bank for the ambient light incident on the cover. Since the second display region A2, in particular if it is formed as a black print region, is strongly light-reflective without further measures, this could have the result that the driver is dazzled by renewed reflection of the ambient light reflected on the cover.

To avoid this, it is provided that the cover 22 is provided with a first polarization filter 26, which transmits light of a first polarization direction, couples it into the cover plate 25, and conducts it through the cover plate 25 of the cover 22 into the interior of the projection device 21, while light of a second polarization direction is completely reflected. The light of the second polarization direction is reflected in the windscreen base region A2 due to the curvature of the cover plate 25.

The first polarization filter 26 can be formed as a wire mesh polarizer or as another reflective polarizer, in particular as a multilayer polarizer, which has the above-mentioned properties.

The windscreen base region A2 has a second polarization filter 9, which couples light of the second polarization direction into the windscreen base region A2 and it is either transmitted there or, if this is formed as a black print region, it is absorbed. Light of the first polarization direction, in contrast, is reflected by the second polarization filter 9.

This behavior can be used by the windscreen base display device 3 when it outputs the second image information using light of the first polarization direction. The second image information can thus be reflected completely in the direction of the driver or the eye region 8 in spite of the provision of the second polarization filter 9 in the windscreen base region A2.

As a result, both items of image information, i.e., the first image information of the head-up display device and the second image information of the windscreen base display device, are represented by light of a first polarization direction.

The first polarization direction can correspond to an s-polarization direction and the second polarization direction to a p-polarization direction. However, it is also possible to provide the first polarization direction as the p-polarization direction and the second polarization direction as the s-polarization direction, so that both items of image information are represented to the driver as p-polarized images. This has the advantage that sunglasses absorbing s-polarized light do not suppress the perception of the displayed items of image information.

Figure 2:
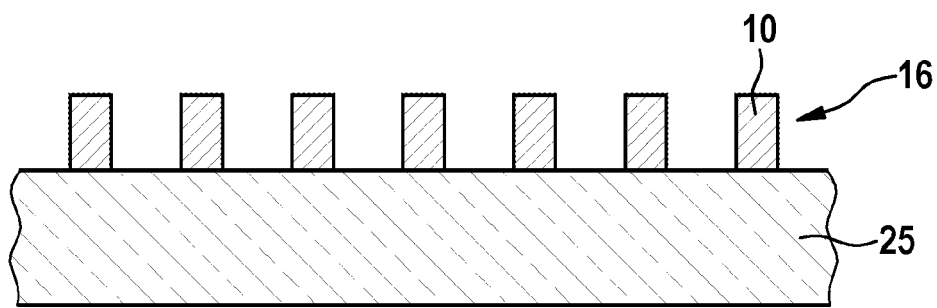
FIG. 2 shows a cross-sectional view through a cover having a cover plate having a wire mesh polarizer.

FIG. 2 shows a cross-sectional view through a wire mesh polarizer as the polarization filter 26, 9. The wire mesh polarizer is applied to the cover plate 25 or the inside of the windscreen in the second display region A2. The protruding structures 10 attached in parallel to one another can be seen, which extend in parallel to one another and are preferably formed from a metal. For example, the wire mesh polarizer can have a structure spacing of 50-100 nm. The structure width can be 50-100 nm and the structure height can be 100-500 nm.

LIST OF REFERENCE SIGNS 1 windscreen display system
2 head-up display device
21 projection device
22 cover
23 mirror
24 projector
25 cover plate
26 first polarization filter
3 windscreen base display device
31 display device
4 dashboard
5 windscreen
6 upper side of the dashboard
8 eye region
6 upper side of the dashboard
9 second polarization filter
10 protruding structures
A1 first display region
A2 second display region
P projection beam

What is claimed is:

1. A windscreen display system for a motor vehicle, the windscreen display system comprising:
   a head-up display device comprising:
      a projection device for emitting a projection light beam having a first item of image information in a direction of a first display region of a windscreen, so that the projection light beam is reflected at the first display region and is perceptible in an eye region, and
      a transparent cover for protecting the projection device, wherein the cover has a cover plate and a first polarization filter, wherein:
   the first polarization filter transmits light of a first polarization direction and completely reflects light of a second polarization direction,
   the cover is arranged and curved such that a reflected component of ambient light in the second polarization direction is largely reflected on a windscreen base region of the windscreen,
   the windscreen base region is formed as a black print region and is provided with a second polarization filter, which is configured to reflect light of the first polarization direction and transmit light of the second polarization direction,
   a windscreen base display device is provided in order to output a second item of image information via a display device,
   the second item of image information is reflected in the windscreen base region so that the reflected second item of image information is perceptible in the eye region, and
   the display device outputs the second image information using light of the first polarization direction.

2. The windscreen display system according to claim 1, wherein at least one of the first polarization filter or the second polarization filter is formed as a wire mesh polarizer or as a multilayer reflection polarizer.

3. The windscreen display system according to claim 1, wherein:

the first polarization direction corresponds to an s-polarization direction and the second polarization direction corresponds to a p-polarization direction, or the first polarization direction corresponds to a p-polarization direction and the second polarization direction corresponds to an s-polarization direction.

* * * * *